United States Patent
Hlasny et al.

(10) Patent No.: US 8,205,235 B2
(45) Date of Patent: Jun. 19, 2012

(54) SYSTEMS AND METHODS FOR REPRESENTING A TUNER DEVICE IN A MEDIA SERVER CONTENT DIRECTORY SERVICE

(75) Inventors: Daryl J. Hlasny, Vancouver, WA (US); Sankar Radhakrishnan, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1440 days.

(21) Appl. No.: 10/839,031

(22) Filed: May 5, 2004

(65) Prior Publication Data
US 2005/0108766 A1   May 19, 2005

Related U.S. Application Data

(60) Provisional application No. 60/520,156, filed on Nov. 14, 2003, provisional application No. 60/526,831, filed on Dec. 3, 2003.

(51) Int. Cl.
*H04N 7/18* (2006.01)
*H04N 5/50* (2006.01)

(52) U.S. Cl. .................................... 725/80; 348/731

(58) Field of Classification Search .................. 725/117, 725/114, 105, 80, 83; 348/731
See application file for complete search history.

(56) References Cited

U.S. PATENT DOCUMENTS

| | | | |
|---|---|---|---|
| 6,381,507 B1 | 4/2002 | Shima et al. | |
| 6,628,301 B1 * | 9/2003 | Acton et al. | 715/716 |
| 6,829,656 B1 * | 12/2004 | Szucs et al. | 709/250 |
| 6,966,063 B1 * | 11/2005 | Meric et al. | 719/321 |
| 7,085,814 B1 * | 8/2006 | Gandhi et al. | 709/208 |
| 2002/0029256 A1 | 3/2002 | Zintel et al. | |
| 2002/0144281 A1 * | 10/2002 | Taguchi et al. | 725/109 |
| 2003/0185156 A1 | 10/2003 | Sato et al. | |
| 2003/0194968 A1 * | 10/2003 | Young | 455/45 |
| 2003/0229900 A1 | 12/2003 | Reisman | |
| 2004/0175098 A1 * | 9/2004 | Calhoon et al. | 386/46 |
| 2006/0242664 A1 | 10/2006 | Kikkawa et al. | |

(Continued)

FOREIGN PATENT DOCUMENTS
JP    2002-304333    10/2002

(Continued)

OTHER PUBLICATIONS

"Design and Implementation of Distributed Object-Oriented Infrastructures for Networked Home Appliances on Commodity Operating Systems," Nakajima et al., Object-Oriented Real-Time Distributed Computing, 2001, ISORC—2001, Proceedings, Fourth IEEE International Symposium on May 2-4, 2001, Piscataway, NJ, USA, IEEE, May 2, 2001, pp. 171-178.

(Continued)

*Primary Examiner* — Hunter B. Lonsberry
*Assistant Examiner* — James Leija
(74) *Attorney, Agent, or Firm* — Austin Rapp & Hardman

(57) ABSTRACT

Systems and methods for representing a tuner device in a content directory service that is implemented in a media server are disclosed. An exemplary method involves representing a tuner as a tuner container. A broadcast channel which is accessible to the tuner is represented as a broadcast item within the tuner container. The exemplary method also involves exposing the broadcast item within the tuner container as an object for browsing by a control point. Information about the broadcast item may be sent to the control point in response to a browse request. A connection may be established with a media renderer for transmission of content from the broadcast channel to the media renderer.

17 Claims, 9 Drawing Sheets

U.S. PATENT DOCUMENTS

2007/0118606 A1    5/2007    Duncan et al.

FOREIGN PATENT DOCUMENTS

| | | |
|---|---|---|
| JP | 2004-015343 | 1/2004 |
| JP | 2004-030112 | 1/2004 |
| JP | 2004-312412 | 11/2004 |
| JP | 2004-312414 | 11/2004 |
| JP | 2004-348454 | 12/2004 |
| JP | 2005-020180 | 1/2005 |
| WO | WO 02/21841 | 3/2002 |
| WO | WO 03/003658 | 1/2003 |
| WO | 2005/043408 | 5/2005 |

OTHER PUBLICATIONS

Ritchie et al., "UPnP AV Architecture:0.83", Jun. 12, 2002, pp. 1-22.

"Specification of the Home Audio/Video Interoperability (HAVI) Architecture," Nov. 19, 1998, pp. 1-409.

UPnP Forum. Jun. 8, 2000. "UPnP Device Architecture Version 1.0," http://www.upnp.org/download/UPnPDA10_20000613.htm.

UPnP Forum. Jun. 25, 2002. "MediaServer: 1 Device Template Version 1.01, For UPnP Version 1.0," http://www.upnp.org/download/MediaServer%201.0.pdf.

UPnP Forum. Jun. 25, 2002. "ContentDirectory: 1 Service Template Version 1.01, For UPnP Version 1.0," http://www.upnp.org/download/ContentDirectory%201.0.prtad.pdf.

Digital Living Network Alliance, Jun. 23, 2004. "Home Networked Device Interoperability Guidelines Version 1.0" http://www.dlna.org/members/DLNA_Home_Networked_Device_Interoperability_Guidelines_v1.0.pdf.

Office Action issued for Japanese Patent Application No. JP 2004-329350 on Mar. 30, 2010.

Published Amendment issued for Japanese Patent Publication No. JP 2004-312412 on Nov. 24, 2005.

Published Amendment issued for Japanese Patent Publication No. JP 2004-312414 on May 11, 2006.

Published Amendment issued for Japanese Patent Publication No. JP 2005-020180 on Jun. 29, 2006.

Decision to Grant issued for Japanese Patent Application No. JP 2004-329350 on Mar. 8, 2011.

Published Amendment issued for Japanese Patent Publication No. JP 2004-348454 on Jun. 22, 2006.

* cited by examiner

SYSTEMS AND METHODS FOR REPRESENTING A TUNER DEVICE IN A MEDIA SERVER CONTENT DIRECTORY SERVICE

RELATED APPLICATIONS

This application is related to and claims priority from U.S. Provisional Patent Application Ser. No. 60/520,156 filed Nov. 14, 2003, for "Tuner Representation in UPnP CDS," with inventor Daryl Hlasny, which is incorporated herein by reference.

This application is related to and claims priority from U.S. Provisional Patent Application Ser. No. 60/526,831 filed Dec. 3, 2003, for "Device Discovery Control and Media Management Section Submission," with inventors Daryl Hlasny and Sankar Radhakrishnan, which is incorporated herein by reference.

TECHNICAL FIELD

The present invention relates generally to digital media technology. More specifically, the present invention relates to systems and methods for representing a tuner device in a content directory service that is implemented in a media server device.

BACKGROUND

The Digital Home Network Group (DHWG) is an industry alliance formed for the purpose of defining an interoperability framework for networked media devices. The DHWG has selected Universal Plug and Play (UPnP) technology to provide the necessary infrastructure to enable media transfer between different consumer devices. The UPnP networking technology provides flexibility for media configuration and transport management for consumer electronic devices. Within a home network, a device with media processing capability may use UPnP technology to facilitate its connectivity to other devices.

The current version of the UPnP AV specification defines a media server, a media renderer, and a control point. The media server has access to media content and can send that media content to other devices. The media renderer is able to receive media content and render that content. In typical implementations, the media renderer is either connected to or integrated with a display device for displaying the rendered content. The control point coordinates the operation of the media server and the media renderer in order to accomplish the desires of the end-user.

The UPnP AV specification includes a template for necessary services to manage media rendering devices and media server devices. Such services include a connection manager service, an AV transport service, and a content directory service (CDS). The connection manager service provides the methods for a control point to get sink and source capabilities of media rendering and media server devices, along with other control details. The AV transport service provides control methods for media rendering devices. The CDS service provides control methods for the media server devices as well as schema for organizing media items and their attributes.

In implementations of the CDS service, media files (e.g., audio files, video files, images, etc.) are represented as objects. The current version of the CDS specification describes a class system for representing media objects. The base class is the object class. Two classes are derived from the object class, the item class and the container class. An item (i.e., an instance of the item class) does not include any other objects. A container (i.e., an instance of the container class) may include at least one other object.

The CDS specification defines a number of classes that are derived from the item class, including an imageItem class, an audioItem class, a videoItem class, etc. The CDS specification also defines an audioBroadcast class and a videoBroadcast class. The audioBroadcast class is derived from the audioItem class. The videoBroadcast class is derived from the videoItem class. The definition of a class includes required and optional properties which may be expressed as XML elements or attributes.

A tuner is a device that is configured to access broadcast channels, such as television channels, radio channels, etc. The current version of the CDS specification does not include means for representing tuner devices. The existing methods and attributes defined in the current version of the CDS specification need additional enhancements to represent a tuner device. Accordingly, benefits may be realized by systems and methods for representing a tuner device in a content directory service that is implemented on a media server.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
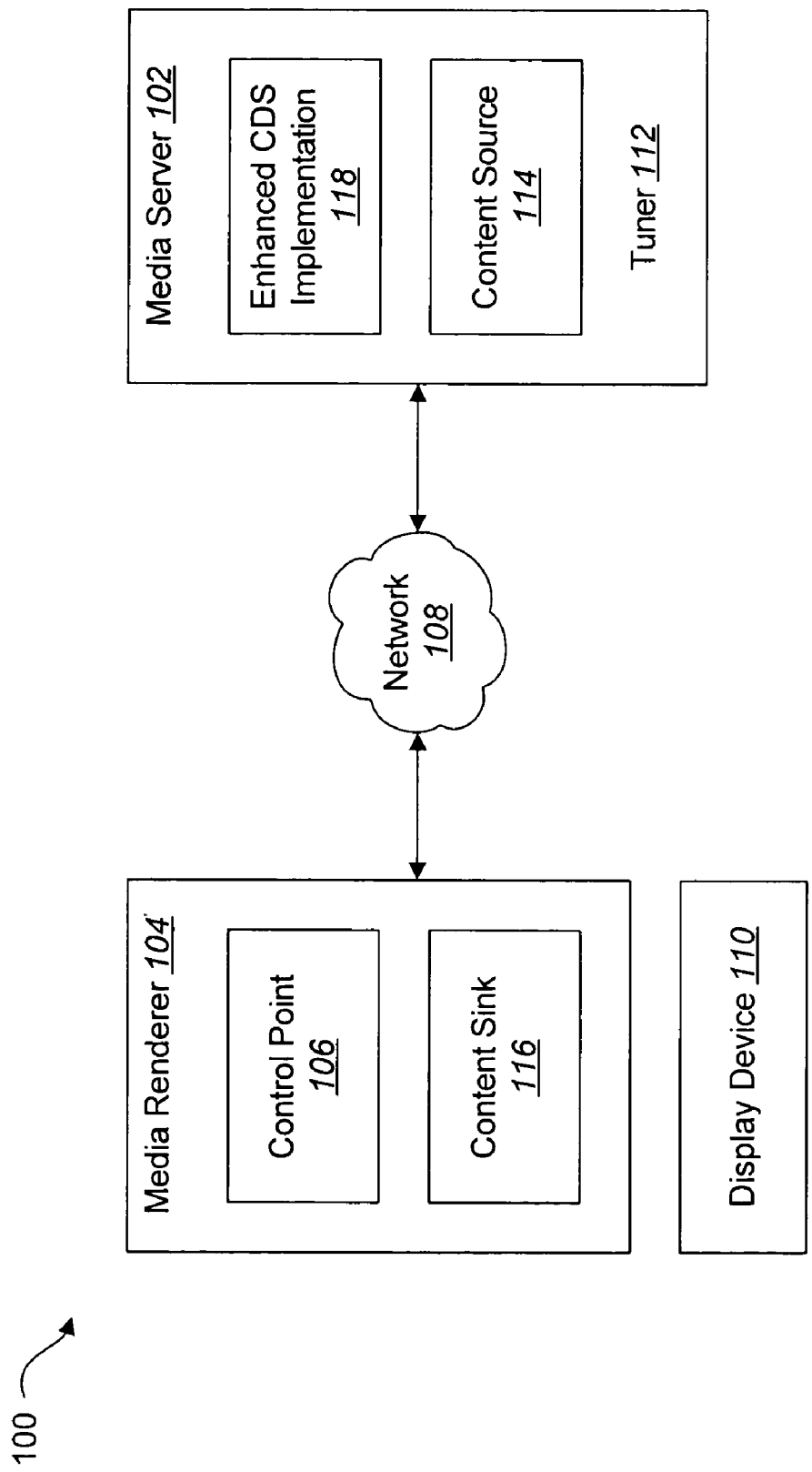
FIG. 1 is a block diagram illustrating an embodiment of a system that uses UPnP AV technology and that includes an embodiment of an enhanced content directory service (CDS) implementation.

A media server device is disclosed. The media server device includes a tuner for accessing a plurality of broadcast channels and providing content from the plurality of broadcast channels to a media renderer. The media server device also includes an enhanced content directory service implementation. The enhanced content directory service implementation includes a tuner container that represents the tuner. The enhanced content directory service implementation also includes a plurality of broadcast items within the tuner container that represent the plurality of broadcast channels. The plurality of broadcast items are arranged within the tuner container in an order that corresponds to a channel scanning order of the tuner.

In some embodiments, the plurality of broadcast channels are audio broadcast channels and the plurality of broadcast items are audio broadcast items. Alternatively, in some embodiments the plurality of broadcast channels are video broadcast channels and the plurality of broadcast items are video broadcast items.

Another embodiment of a media server device is also disclosed. The media server device includes a tuner for accessing a plurality of broadcast channels and providing content from the plurality of broadcast channels to a media renderer. The media server device also includes an enhanced content directory service implementation. The enhanced content directory service implementation includes a tuner container that represents the tuner. The enhanced content directory service implementation also includes a plurality of broadcast items within the tuner container that represent the plurality of broadcast channels. Each of the plurality of broadcast items has a unique channel number associated therewith.

A method in a media server device is also disclosed. The method involves representing a tuner as a tuner container. The method also involves representing a broadcast channel which is accessible to the tuner as a broadcast item within the tuner container. The method also involves exposing the broadcast item within the tuner container as an object for browsing by a control point.

In some embodiments, the method may also involve sending information about the broadcast item to the control point in response to a browse request. The method may also involve establishing a connection with a first media renderer for transmission of content from the broadcast channel to the first media renderer.

The method may also involve transmitting a channel selection notification to the control point when a selected broadcast channel of the tuner is changed. In some embodiments, a reference object is created within the tuner container when the selected broadcast channel is changed, thereby triggering the channel selection notification. The reference object may be created within a channel select feedback container within the tuner container.

When a connection request is received from a second media renderer, the method may involve accepting the connection request from the second media renderer and disconnecting the connection to the first media renderer. Alternatively, the method may involve accepting the connection request from the second media renderer, maintaining the connection to the first media renderer, and receiving a channel selection from the second media renderer.

A computer-readable medium for storing program data is also disclosed. The program data comprises executable instructions for implementing a method in a media server device. The method involves representing a tuner as a tuner container. The method also involves representing a broadcast channel which is accessible to the tuner as a broadcast item within the tuner container. The method also involves exposing the broadcast item within the tuner container as an object for browsing by a control point.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

As indicated previously, the current version of the UPnP AV CDS does not provide sufficient rules (schema) to adequately represent a tuner and its related operating characteristics. Embodiments disclosed herein relate to systems and methods for representing a tuner device in a digital network that uses the UPnP AV CDS specification. Extensions to the CDS are discussed which facilitate the representation of various characteristics of a tuner device.

FIG. 1 is a block diagram illustrating an exemplary system 100 using UPnP AV technology. The system 100 includes a media server 102, a media renderer 104, and a control point 106. The media server 102, the media renderer 104, and the control point 106 are interconnected via a computer network 108.

The media server 102 has access to media content and can send that media content to another device via the network 108. The media renderer 104 is able to receive media content from the server 102 and render that content. The media renderer 104 is either connected to or integrated with a display device 110. The control point 106 coordinates the operation of the media server 102 and the media renderer 104 in order to accomplish the desires of the end-user.

In the illustrated embodiment, the control point 106 is shown as being part of the media renderer 104. In alternative embodiments, however, the control point 106 may be located in a device that is separate from the media renderer 104.

The media server 102 includes a tuner 112. The tuner 112 is a device that is configured to access broadcast channels, such as television channels, radio channels, etc. The portion of the tuner 112 that transmits the content to the renderer 104 can be thought of as a content source 114. The portion of the renderer 104 that receives the content can be thought of as a content sink 116.

The server 102 includes an enhanced UPnP AV content directory service (CDS) implementation 118. The enhanced CDS implementation 118 allows any media renderer 104 that is in communication with a control point 106 to browse the enhanced CDS implementation 118 to determine what broadcast channels are accessible to the tuner 112. The enhanced CDS implementation 118 also allows a media renderer 104 to establish a connection to the tuner 112 and receive a selected broadcast channel from the tuner 112. These and other features of various embodiments of the enhanced CDS implementation 118 will be described below.

Figure 2:
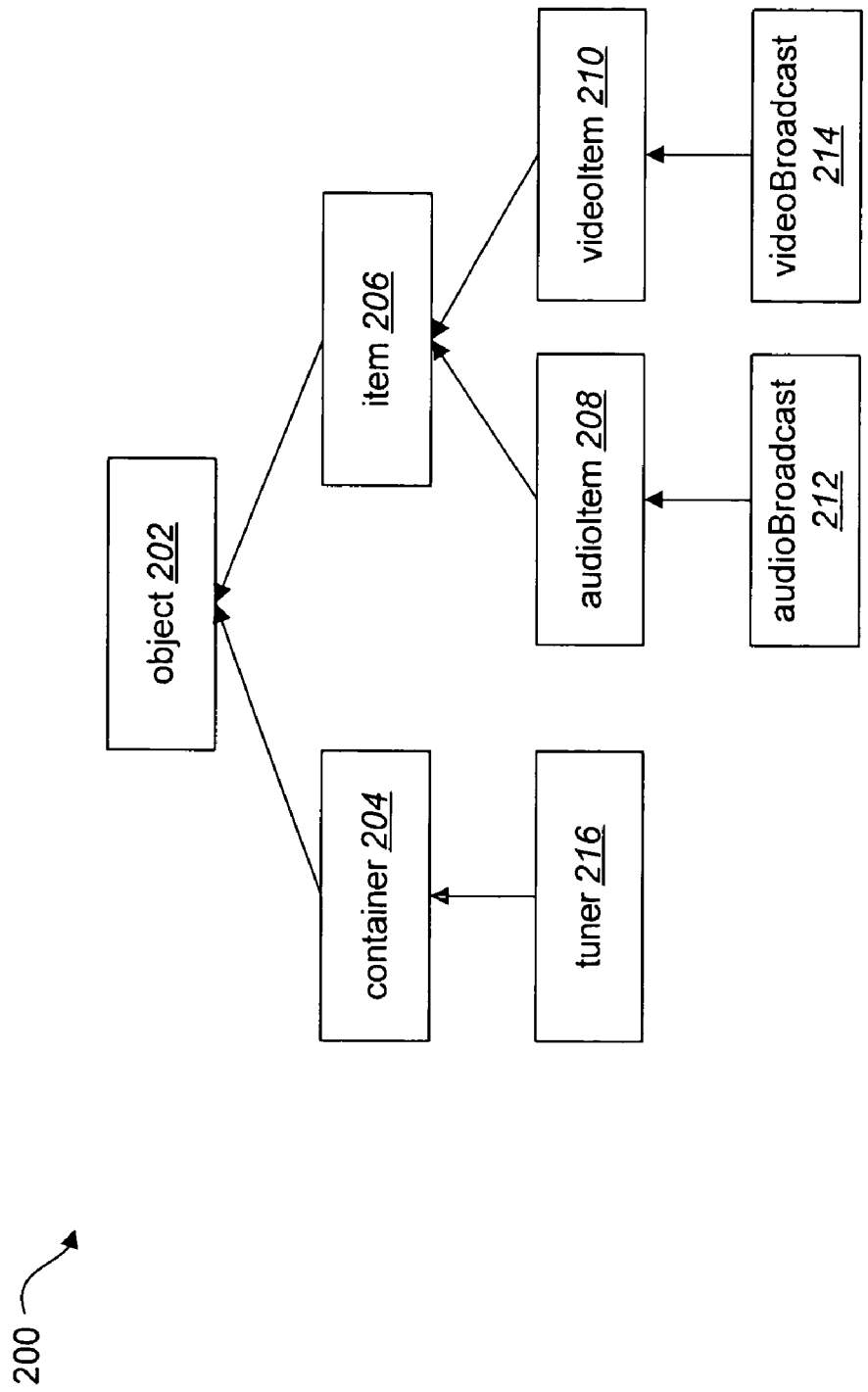
FIG. 2 is a block diagram illustrating an exemplary class hierarchy that may be used by the enhanced CDS implementation to represent a tuner.

In embodiments disclosed herein, the enhanced CDS implementation 118 represents the tuner 112 and its characteristics as objects, where each object is a member of a class. FIG. 2 is a block diagram illustrating an exemplary class hierarchy 200 that may be used by the enhanced CDS implementation 118 to represent the tuner 112. The base class, from which all other classes are derived, is named object 202. There are two classes that are derived directly from the object class, the container class 204 and the item class 206. A container (i.e., an instance of the container class 204) may contain other objects. An item (i.e., an instance of the item class 206) does not contain any other objects.

An audioItem class 208 and a videoItem class 210 are derived from the item class 206. An audioBroadcast class 212 is derived from the audioItem class 208. An audioBroadcast item (i.e., an instance of the audioBroadcast class 212) represents a particular audio broadcast. A videoBroadcast class 214 is derived from the videoItem class 210. A videoBroadcast item (i.e., an instance of the videoBroadcast class 214) represents a particular video broadcast.

A tuner class 216 is derived from the container class 204. A tuner container (i.e., an instance of the tuner class 216) represents a tuner 112. A tuner container contains only audioBroadcast items and/or videoBroadcast items. The properties of the tuner container can be used to expose information about the tuner 112 to other devices.

The abstract representation of a tuner as a CDS container enables a functional framework for a consumer electronics (CE) device with embedded tuner(s) 112. It allows a CE device to accommodate any number of tuners 112 as embedded devices. Each tuner device 112 can expose as many media broadcast channels as it supports. As will be explained in greater detail below, the broadcast channels are listed as media items (e.g., audioBroadcast items, videoBroadcast items) in the CDS container. The broadcast channels can be audio broadcast channels or video broadcast channels (which may include both audio and video signals).

Figure 3:
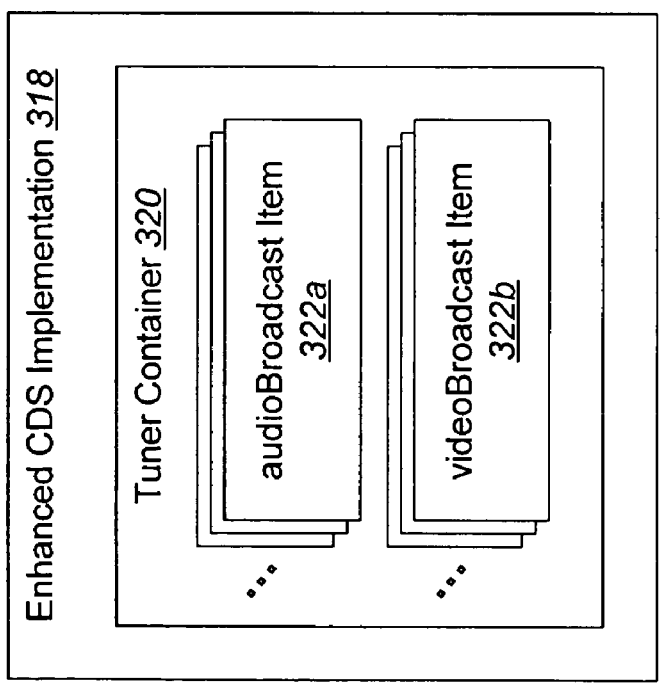
FIG. 3 is a block diagram illustrating an embodiment of the enhanced CDS implementation.

FIG. 3 is a block diagram illustrating an embodiment of the enhanced CDS implementation 318. The enhanced CDS implementation 318 includes a tuner container 320. The tuner container 320 is an instance of the tuner class 216. The tuner container 320 represents the tuner 112.

The tuner container 320 includes one or more broadcast items 322. As used herein, the term "broadcast item" 322 refers to either an audioBroadcast item 322a or a videoBroadcast item 322b. Each audioBroadcast item 322a is an instance of the audioBroadcast class 212. Each audioBroadcast item 322a represents a particular audio broadcast channel (e.g., radio station) that is accessible to the tuner 112. The tuner container 320 also includes one or more videoBroadcast items 322b. Each videoBroadcast item 322b is an instance of the videoBroadcast class 214. Each videoBroadcast item 322b represents a particular video broadcast channel (e.g., television station) that is accessible to the tuner 112.

In some embodiments, the order in which the broadcast items 322 are arranged in the tuner container 320 corresponds to the order in which the broadcast items 322 are provided to a control point 106 that is browsing the tuner container 320. Also, in some embodiments, the order of the broadcast items 322 within the tuner container 320 corresponds to the normal scanning order of the tuner's 112 broadcast channels.

Figure 4:
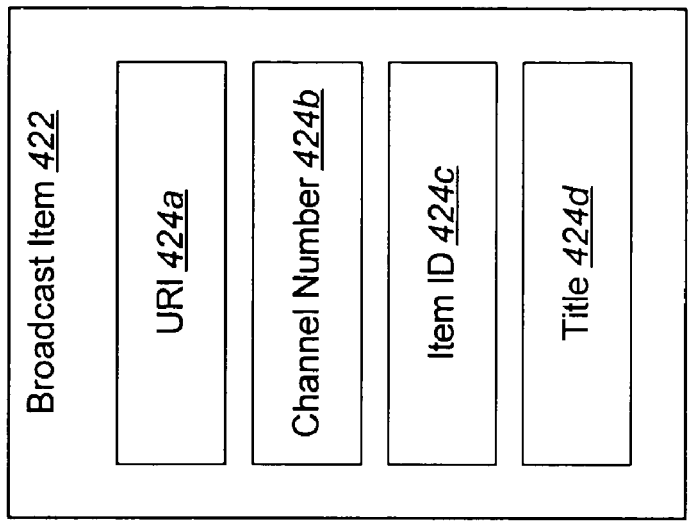
FIG. 4 is a block diagram illustrating an embodiment of a broadcast item.

Each broadcast item 322 in the tuner container 320 has certain properties. FIG. 4 is a block diagram illustrating an embodiment of a broadcast item 422. Some exemplary properties 424 are associated with the broadcast item 422.

One property 424 that may be associated with each broadcast item 422 is a universal resource identifier (URI) 424a. The media renderer 104 may use the URI 424a to connect to the corresponding broadcast channel (i.e., the broadcast channel that the broadcast item 422 represents).

Another property 424 that may be associated with each broadcast item 422 is a channel number 424b. In some embodiments, each broadcast item 422 in a particular tuner container 320 has a unique channel number 424b associated therewith.

Another property 424 that may be associated with each broadcast item 422 is an item ID 424c. The item ID 424c may be a numeric value, a character string, etc. In some embodiments, the item ID 424c is assigned by the media server 102.

Another property 424 that may be associated with each broadcast item 422 is a title 424d. The title 424d associated with a particular broadcast item 422 may describe the name of the corresponding broadcast channel.

An exemplary XML DIDL-Lite fragment for an audio tuner is now provided.

```
<DIDL-Lite
    xmlns="urn:schemas-upnp-org:metadata-1-0/DIDL-Lite/"
    xmlns:dc="http://purl.org/dc/elements/1.1/"
    xmlns:upnp="urn:schemas-upnp-org:metadata-1-0/upnp/">
    <container id="0" parentID="-1" restricted="1" childcount="1" >
        <dc:title>Root</dc:title>
        <upnp:class>object.container.tuner.audioTuner</upnp:class>
    <!-- AudioTuner -->
    <container id="1" parentID="0" restricted="1" childcount="2" >
        <dc:title>Sharp Audio Tuner</dc:title>
        <dc:creator>Sharp Model No</dc:creator>
        <upnp:class>object.container.tuner.audioTuner</upnp:class>
        <upnp:writeStatus>PROTECTED</upnp:writeStatus>
        <res protocolInfo="http-get:*:application/tunerControl:*">
            http://192.168.0.20:58840/SharpAudioTuner
        </res>
    <!- Audio Channels -->
    <item id="11" parentID="1" restricted="1">
    <!-- Preset #1 -->
    <dc:title>FM91.5</dc:title>
    <upnp:class>object.item.audioItem.audioBroadcast</upnp:class>
```

-continued

```
<upnp:writeStatus>PROTECTED</upnp:writeStatus>
<channelNr>1</channelNr>
<radioBand>FM</radioBand>
<radioStationID>91.5</radioStationID>
<radioCallSign>OPB></radioCallSign>
<res protocolInfo="http-get:*:audio/L16:rate=44100:channels=2">
        http://192.168.0.20:58849/Tuner2/ch1.L16
    </res>
   </item>
<item id="12" parentID="1" restricted="1" >
<!-- Preset #2 -->
<dc:title>FM 101.9</dc:title>
<upnp:class>object.item.audioItem.audioBroadcast</upnp:class>
<upnp:writeStatus>PROTECTED</upnp:writeStatus>
<channelNr>2</channelNr>
<radioBand>FM</radioBand>
<radioStationID>101.9</radioStationID>
<radioCallSign>KQZZ></radioCallSign>
<res protocolInfo="http-get:*:audio/L16:rate=44100:channels=2">
        http://192.168.0.20:58849/Tuner2/ch2.L16
    </res>
     </item>
   </container>
</container>
</DIDL-Lite>
```

Figure 5:
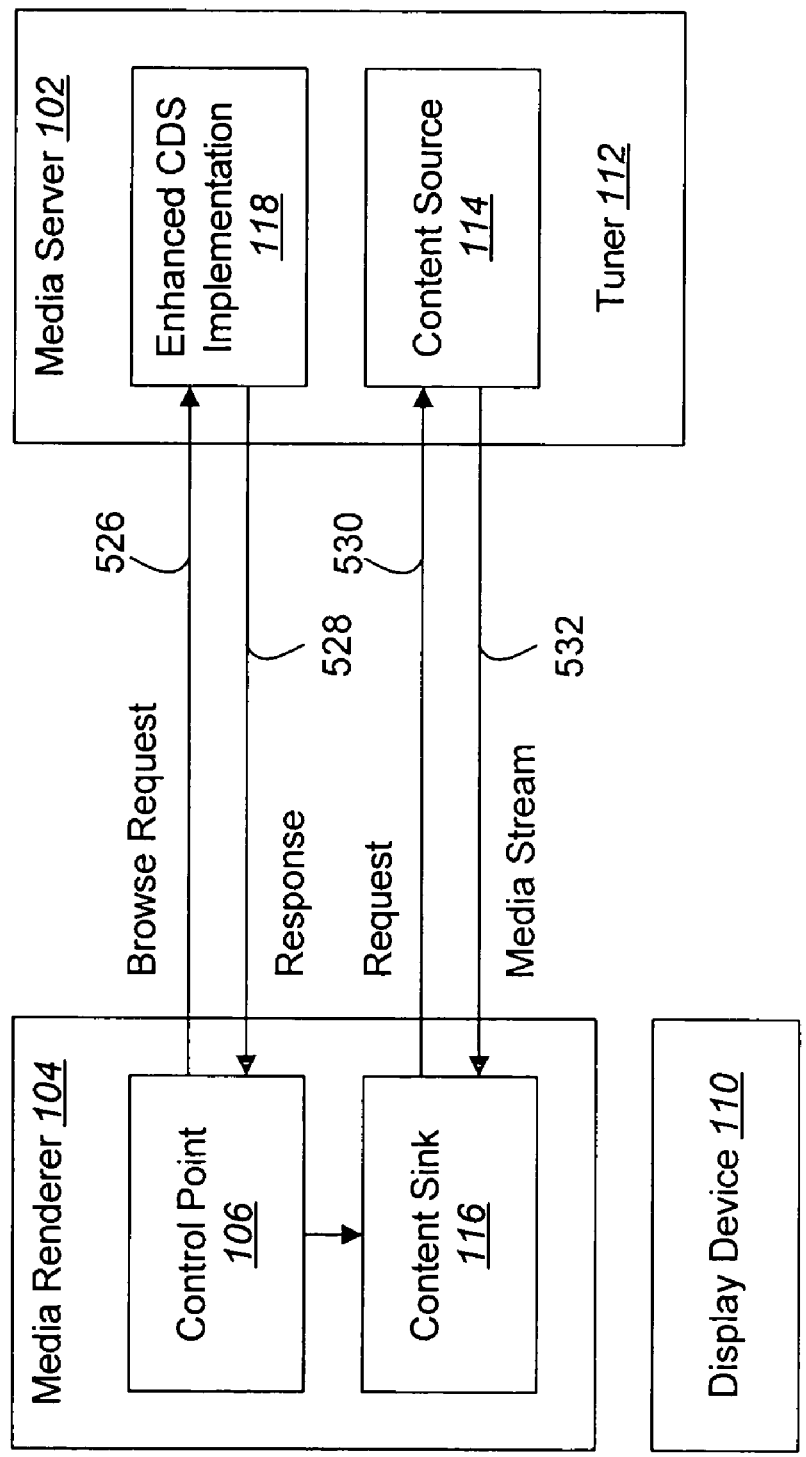
FIG. 5 is a signal flow diagram illustrating exemplary interaction between a media server and a media renderer.

FIG. 5 is a signal flow diagram illustrating exemplary interaction between the media server 102 and the media renderer 104 of FIG. 1. The enhanced CDS implementation 118 exposes the audioBroadcast items 322 and videoBroadcast items 324 contained within the tuner container 320 as objects which can be browsed by the control point 106. The control point 106 browses these objects by sending a browse request 526 to the media server 102. The media server 102 responds to the browse request 526 by sending information 528 about the audioBroadcast items 322a and the videoBroadcast items 322b in the tuner container 320 to the control point 106. The information 528 typically includes the URIs 424a corresponding to the broadcast items 322, transport protocol information (e.g., HTTP, RTSP/RTP, etc.), and possibly other properties of the broadcast items 322.

When an end-user of the media renderer 104 selects a broadcast channel, the media renderer 104 can use the URI 424a from the corresponding broadcast item 322 to establish a connection for transmission of content from the selected broadcast channel to the renderer 104. The connection can be established via a request 530, such as an HTTP_GET request. Using the transport protocol information from the broadcast item 322, a media stream 532 is established between the content source 114 of the tuner 112 and the content sink 116 of the renderer 104.

In typical embodiments, the tuner 112 is only able to access and deliver a single broadcast channel at any given time. In some embodiments, the enhanced CDS implementation 118 may be configured to limit the number of connections to the tuner 112 so that only one media renderer 104 can connect to the tuner 112 and receive a selected broadcast channel at any given time.

Figure 6:
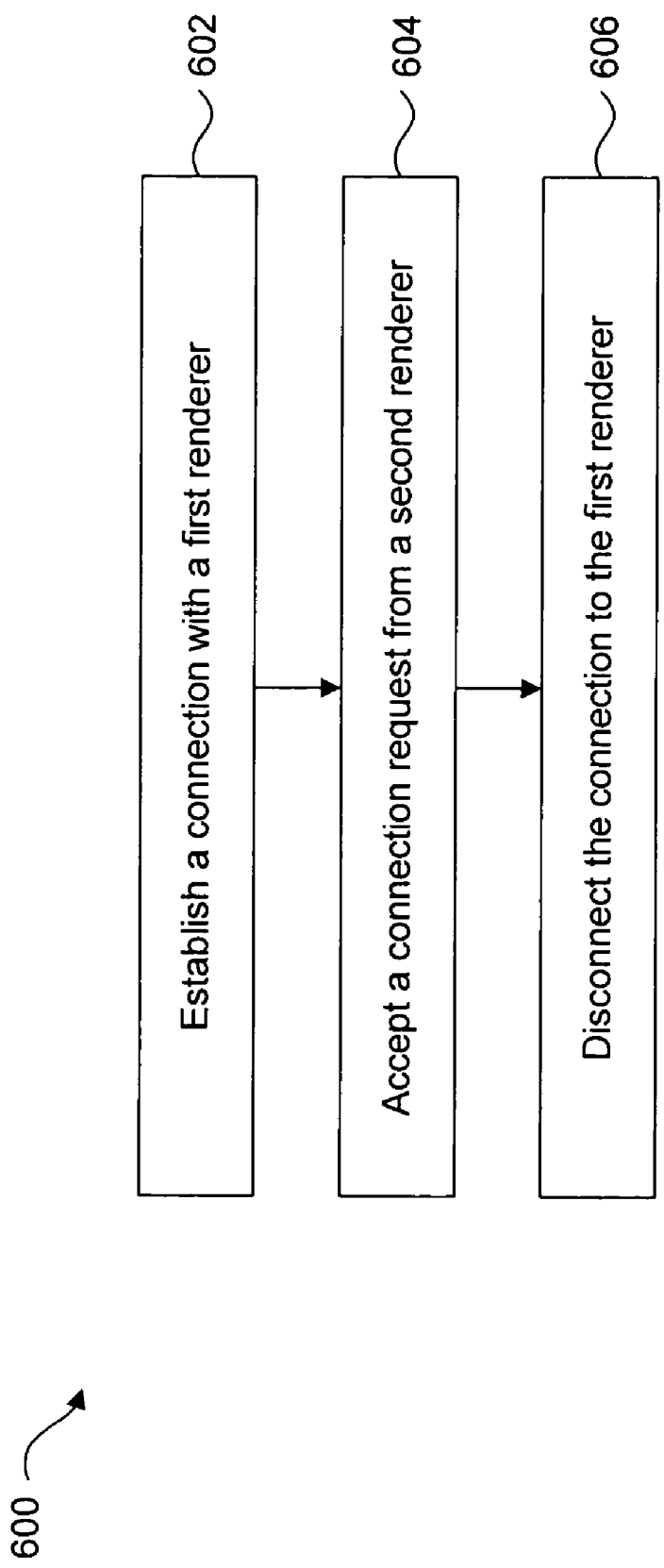
FIG. 6 is a flow diagram illustrating an exemplary method that may be performed by the enhanced CDS implementation.

A flow diagram of an exemplary method 600 that illustrates such an approach is shown in FIG. 6. The media server 102 establishes 602 a connection with a first media renderer 104 for transmission of content from a selected broadcast channel to the first media renderer 104. When the server 102 accepts 604 a connection request from a second renderer 104, the server 102 disconnects 606 the connection to the first renderer 104.

Figure 7:
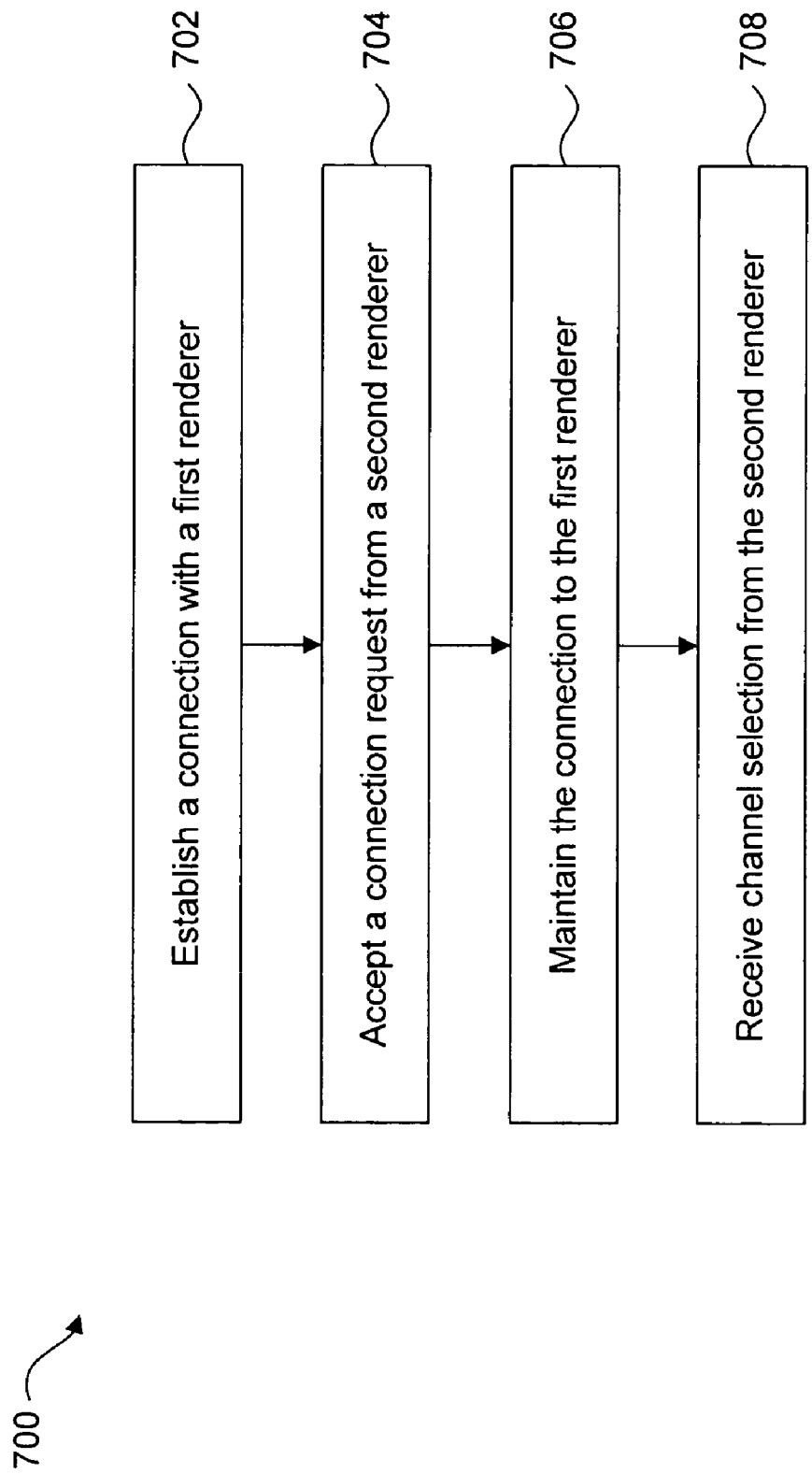
FIG. 7 is a flow diagram illustrating an exemplary method that may be performed by the enhanced CDS implementation.

Alternatively, the enhanced CDS implementation 118 may be configured so that multiple media renderers 104 can connect to the tuner 112 and receive the selected broadcast channel. A flow diagram of an exemplary method 700 that illustrates such an approach is shown in FIG. 7. As before, the media server 102 establishes 702 a connection with a first media renderer 104 for transmission of content from a selected broadcast channel to the first media renderer 104. The server 102 then accepts 704 a connection request from a second renderer 104 and maintains 706 the connection to the first renderer 104. The server 102 receives 708 the current channel selection from the second renderer 104, typically via a control point 106. The control point 106 does not assume that the current connection is to the previously selected channel (the channel selected by the first renderer 104).

Figure 8:
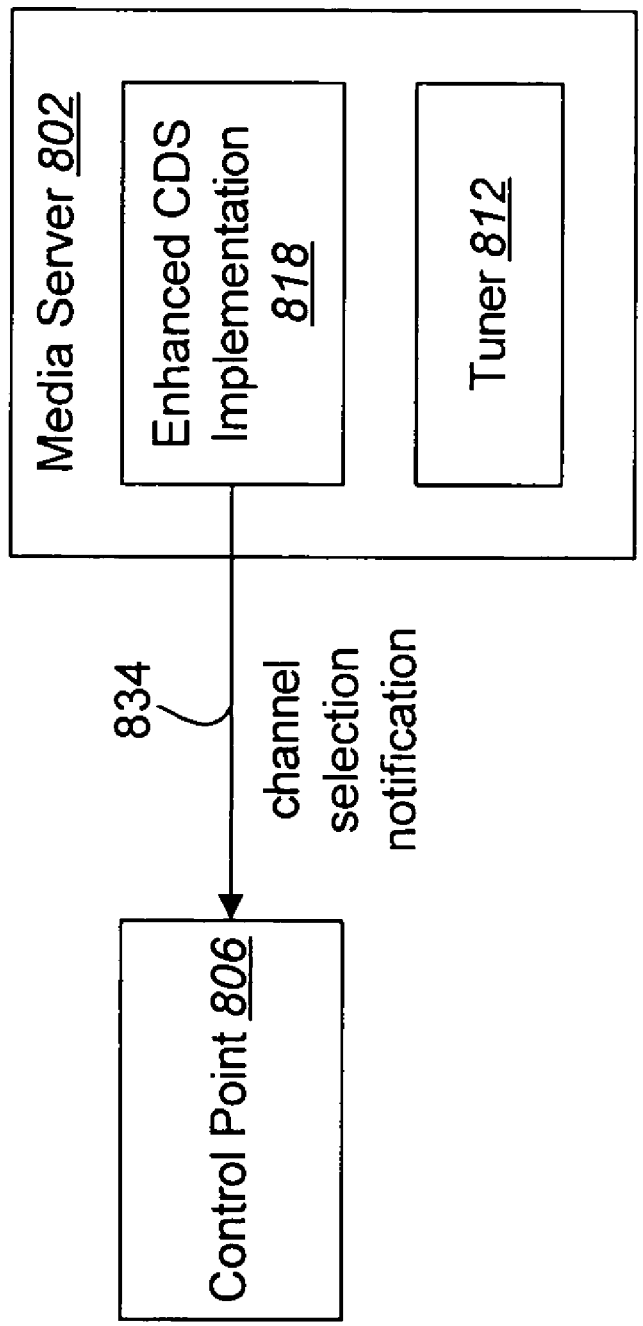
FIG. 8 is a block diagram illustrating a notification message being sent from the enhanced CDS implementation to a control point.

As shown in FIG. 8, whenever the selected channel of the tuner 812 is changed, the enhanced CDS implementation 818 can inform one or more control points 806 of this change. This typically involves sending a channel selection notification message 834 to the control points 806.

The channel selection notification message 834 may be sent using the Generic Event Notification Architecture (GENA). In accordance with this protocol, control points 806 that desire to be informed of state changes within the tuner 812 register with the enhanced CDS implementation 818 to receive event notifications for the tuner 812. The event notifications may be delivered in the CSV format using SOAP messages.

Figure 9:
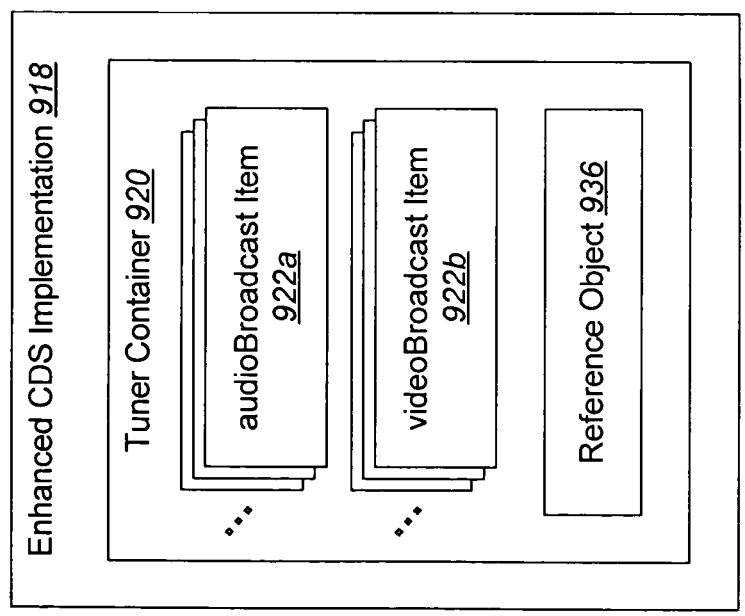
FIG. 9 is a block diagram illustrating another embodiment of the enhanced CDS implementation.

The current version of the CDS specification defines a CDS:ContainerUpdateIDs event. This event can be used to define a channel change notification event. Whenever the selected channel of the tuner 812 is changed, a reference object 936 is created, as shown in FIG. 9. The reference object 936 is an instance of either the audioBroadcast class 212 (if the current channel is an audio broadcast) or the videoBroadcast class 214 (if the current channel is a video broadcast).

The reference object 936 contains a reference to the broadcast item 922 that corresponds to the currently selected channel. In some embodiments, the item@refId property of the reference object 936 refers to the broadcast item 922 which the tuner 812 is currently tuned to. When a new reference object 936 is created, any reference objects 936 that refer to unselected channels are deleted.

The act of creating a reference object 936 triggers the CDS:ContainerUpdateIDs event. The enhanced CDS implementation 918 sends a notification 834 of the CDS:ContainerUpdateIDs event to the control points 806 that have registered to receive event notifications for the tuner 812.

The following DIDL-Lite fragment contains an exemplary reference object 936 for the audio tuner example from above:

```
<DIDL-Lite
    xmlns="urn:schems-upnp-org:metadata-1-0/DIDL-Lite/"
    xmlns:dc="http://purl.org/dc/elements/1.1/"
    xmlns:upnp="urn:schemas-upnp-org:metadata-1-0/upnp/">
    <container id="0" parentID="-1" restricted="1" childcount="1" >
        <dc:title>Root</dc:title>
        <upnp:class>object.container.tuner.audioTuner</upnp:class>
    <!-- AudioTuner -->
    <container id="1" parentID="0" restricted="1" childcount="3" >
        <dc:title>Sharp Audio Tuner</dc:title>
        <dc:creator>Sharp Model No</dc:creator>
        <upnp:class>object.container.tuner.audioTuner</upnp:class>
        <upnp:writeStatus>PROTECTED</upnp:writeStatus>
        <res protocolInfo="http-get:*:application/tunerControl:*">
           http://192.168.0.20:58840/SharpAudioTuner
        </res>
<!- Audio Channel -->
<item id="11" parentID="1" restricted="1">
<!-- Preset #1 -->
<dc:title>FM 91.5</dc:title>
```

```
<upnp:class>object.item.audioItem.audioBroadcast</upnp:class>
<upnp:writeStatus>PROTECTED</upnp:writeStatus>
<channelNr>1</channelNr>
<radioBand>FM</radioBand>
<radioStationID>91.5</radioStationID>
<radioCallSign>OPB></radioCallSign>
<res protocolInfo="http-get:*:audio/L16:rate=44100:channels=2">
        http://192.168.0.20:58849/Tuner2/ch1.L16
   </res>
      </item>
<!- Currently selected Audio Channel -->
<item id="12" parentID="1" restricted="1" >
<!-- Preset #2 -->
<dc:title>FM 101.9</dc:title>
<upnp:class>object.item.audioItem.audioBroadcast</upnp:class>
<upnp:writeStatus>PROTECTED</upnp:writeStatus>
<channelNr>2</channelNr>
<radioBand>FM</radioBand>
<radioStationID>101.9</radioStationID>
<radioCallSign>KQZZ></radioCallSign>
<res protocolInfo="http-get:*:audio/L16:rate=44100:channels=2">
        http://192.168.0.20:58849/Tuner2/ch2.L16
   </res>
      </item>
<!-Reference Object - To currently selected channel -->
<item id="12A" refID="12" parentID="1" restricted="1">
<!-- Preset #2 -->
<dc:title>FM 101.9</dc:title>
   <upnp:class>object.item.audioItem.audioBroadcast</upnp:class>
       </item>
     </container>
</container>
</DIDL-Lite>
```

Figure 10:
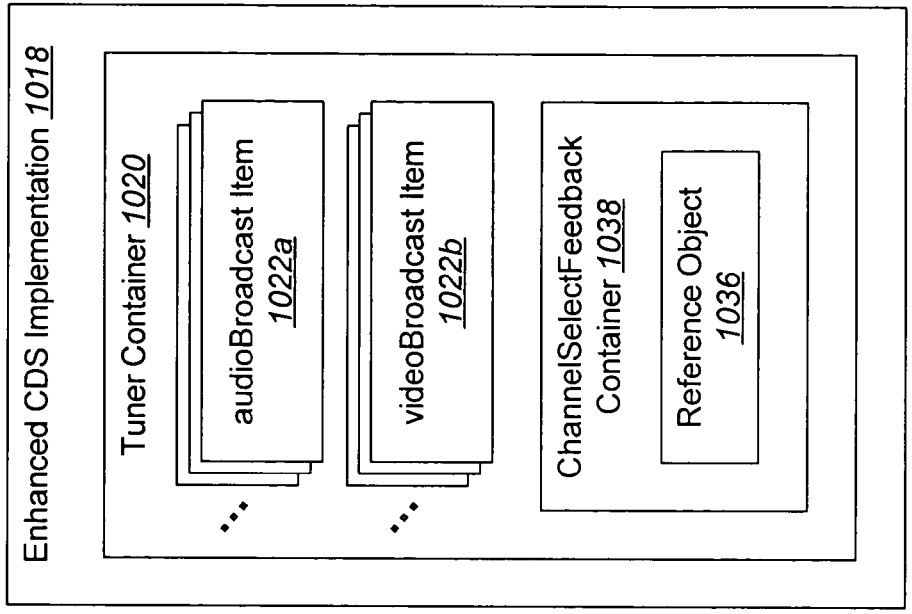
FIG. 10 is a block diagram illustrating another embodiment of the enhanced CDS implementation.

In some embodiments, a special purpose container can be created within the tuner container 1020, as shown in FIG. 10. In the illustrated embodiment, the special purpose container is referred to as a ChannelSelectFeedback container 1038. In some embodiments, when a reference object 1036 is created in response to the broadcast channel being changed, the reference object 1036 is created within the ChannelSelectFeedback container 1038. In such embodiments, the control point 106 may be configured to only listen to CDS:ContainerUpdateIDs events that are related to the ChannelSelectFeedback container 1038. In this way, the channel selection action may be isolated from other activities that take place with the tuner container 1020 (e.g., browsing, searching, etc.) and that also trigger CDS:ContainerUpdateIDs events.

The following DIDL-Lite fragment shows this case for the audio tuner example from above:

```
<DIDL-Lite
   xmlns="urn:schemas-upnp-org:metadata-1-0/DIDL-Lite/"
   xmlns:dc="http://purl.org/dc/elements/1.1/"
   xmlns:upnp="urn:schemas-upnp-org:metadata-1-0/upnp/">
   <container id="0" parentID="-1" restricted="1" childcount="1" >
      <dc:title>Root</dc:title>
      <upnp:class>object.container.tuner.audioTuner</upnp:class>
      <!-- AudioTuner -->
      <container id="1" parentID="0" restricted="1" childcount="2" >
         <dc:title>Sharp Audio Tuner</dc:title>
         <dc:creator>Sharp Model No</dc:creator>
         <upnp:class>object.container.tuner.audioTuner</upnp:class>
         <upnp:writeStatus>PROTECTED</upnp:writeStatus>
         <res protocolInfo="http-get:*:application/tunerControl:*">
             http://192.168.0.20:58840/SharpAudioTuner
         </res>
<!- Audio Channel -->
<item id="11" parentID="1" restricted="1">
<!-- Preset #1 -->
<dc:title>FM 91.5</dc:title>
<upnp:class>object.item.audioItem.audioBroadcast</upnp:class>
<upnp:writeStatus>PROTECTED</upnp:writeStatus>
<channelNr>1</channelNr>
<radioBand>FM</radioBand>
<radioStationID>91.5</radioStationID>
<radioCallSign>OPB></radioCallSign>
<res protocolInfo="http-get:*:audio/L16:rate=44100:channels=2">
        http://192.168.0.20:58849/Tuner2/ch1.L16
   </res>
      </item>
<!- Currently selected Audio Channel -->
<item id="12" parentID="1" restricted="1" >
<!-- Preset #2 -->
<dc:title>FM 101.9</dc:title>
<upnp:class>object.item.audioItem.audioBroadcast</upnp:class>
<upnp:writeStatus>PROTECTED</upnp:writeStatus>
<channelNr>2</channelNr>
<radioBand>FM</radioBand>
<radioStationID>101.9</radioStationID>
<radioCallSign>KQZZ></radioCallSign>
<res protocolInfo="http-get:*:audio/L16:rate=44100:channels=2">
        http://192.168.0.20:58849/Tuner2/ch2.L16
   </res>
      </item>
<!-ChannelSelectFeedback Container -->
<container id="1A" parentID="1" restricted="1" childcount="1" >
   <dc:title>Channel Select Feedback Container</dc:title>
      <upnp:class>object.container</upnp:class>
<!-Reference Object - To currently selected channel -->
<item id="12A" refID="12" parentID="1A" restricted="1">
<dc:title>FM 101.9</dc:title>
<upnp:class>object.item.audioItem.audioBroadcast</upnp:class>
   </item>
      </container>
      </container>
     </container>
</DIDL-Lite>
```

An exemplary schema which may be used to define the representation of a tuner 112 in an embodiment of the enhanced CDS implementation 118 is provided in the table below. The first column of the table indicates the name of an element or feature of the enhanced CDS implementation 118. The second column of the table indicates the relation of the element or feature to the current UPnP AV standard. The letter "A" indicates that the element/feature adds to the standard. The letter "C" indicates that the element/feature clarifies the use of the standard. The third column of the table includes rules for the element/feature. The fourth column of the table includes comments.

TABLE 1

| Element/Feature | | Rules | Comments |
| --- | --- | --- | --- |
| CDS Schema: video tuner | A | When Media Server provides live contents from video tuner or input terminals, they are represented as objects of the object.item.videoItem.videoBroadcast class corresponding to a broadcast stations or input terminals. | This class of object item is currently defined in UPnP schema for live video streams |

TABLE 1-continued

| Element/Feature | Rules | | Comments |
|---|---|---|---|
| CDS Schema: audio tuner | A | When Media Server provides live contents from audio tuner or input terminals, they are represented as objects of the object.item.audioItem.audioBroadcast class corresponding to a broadcast stations or input terminals. | This class of object item is currently defined in UPnP schema for live audio streams |
| CDS: tuner representation | A | A tuner shall be represented as a container which contains only object items of class object.item.videoItem.videoBroadcast or object.item.audioItem.audioBroadcast. All of the object items in the container are of the same type. | Using a container allows the resource dependencies to be known by the client. Also allows multiple tuners to be represented in CDS. |
| CDS: Tuner name | A | The container that represents a tuner may have an associated name. The name is given by property dc:title. | This is to allow devices that have multiple tuners to associate a distinct and friendly name with each. |
| CDS: Tuner channel ordering | A | The order of the object items in a container that represents a tuner shall correspond to the normal selection order of the tuner. (e.g., the order of the channel numbers or preset numbers) | This allows the control point to implement channel up/down by selecting the next item in the container |
| CDS: Properties: channel Title | C | The object item may have associated property dc:title. This title should describe the program content if available otherwise should be empty. | This is to clarify the meaning of title in context of a tuner. Some vendors may interpret title as channel name. |
| CDS: Properties: channel Number | A | If the object item has associated property upnp:channelNr. Each channelNR number is unique within the context of its container. | This allows direct input of the channel number by the user to select the channel. |
| CDS: Properties: channel Name | C | The object item may have associated property upnp:channelName. This should be used to identify the channels, not the channel content. | Included for discussion but does not add any additional requirement not already covered by UPnP AV. |
| CDS: Tuner channel selection | A | The channel selection and the connection to the tuner is invoked through the connection establishment to the URI of the resource associated with the object item. | |
| Channel Connection Limitation and Arbitration Logic approach 1 | | | |
| Tuner connection limitation | A | The Media Server shall allow only a single connection to a tuner. | This is to ensure that the channel selected matches the actual stream. This allows valid status information to be presented to the user. |
| Connection arbitration | A | If a second connection to the tuner is initiated the previous connection should be terminated and the new connection allowed. | This makes tuner resource management consistent with the usual UPnP operation. The last client to access the tuner will be given control. |
| Channel Connection Limitation and Arbitration Logic approach 2 | | | |
| CDS: Tuner channel selection | A | If the Media Server supports multiple simultaneous connections to the tuner the last control point to establish a connection to the resource (URI) associated with a tuner channel shall determine the channel selection of the tuner | This is to prevent a control point from locking the resources |
| Tuner control point | A | The control point should not assume that the currently viewed channel is the channel that it previously selected. | Because there is no feed back mechanism between the tuner and the client it is not possible to know the current channel when there a multiple clients connected |

TABLE 1-continued

| Element/Feature | | Rules | Comments |
|---|---|---|---|
| Currently Tuned Channel and its connections notifications and Arbitration Logic | | | |
| CDS: Tuner channel selection Notification | A | Media Server shall use the CDS:ContainerUpdateIDs event to infer the current channel selection. Media Server shall create a reference channel item to the currently selecting channel object. Media Server deletes any existing reference channel item to the unselected channel object. | This is to enable the subscribed control points to get change notifications of the currently viewed channel. |
| Tuner Control Point: channel selection Notification Handling | A | The changes in the CDS:Container UpdateIDs event message are used to infer the changes in tuner channel selection. | Reference objects can be filtered by Browse or Search requests by the control point. |
| CDS: Additional channel selection and Notification | A | Media Server shall create a special purpose container, namely ChannelSelectFeedback within Tuner container. Media Server shall create the reference objects in ChannelSelectFeedback container. This reference object shall point to the Broadcast item that corresponds to the currently selected channel. | Control Point can just focus on this special purpose container to find current channel selection information. |
| Connection with Tuner | | | |
| CDS: Tuner connection support | A | If Media Server allows connection with the Tuner, it should expose the URI in the <res> element of the Tuner container, and Media Server should allow the connection to the Tuner irrespective of its channel selection state. | This is to enable the control points to get connected to the tuner without selecting channel. |

Figure 11:
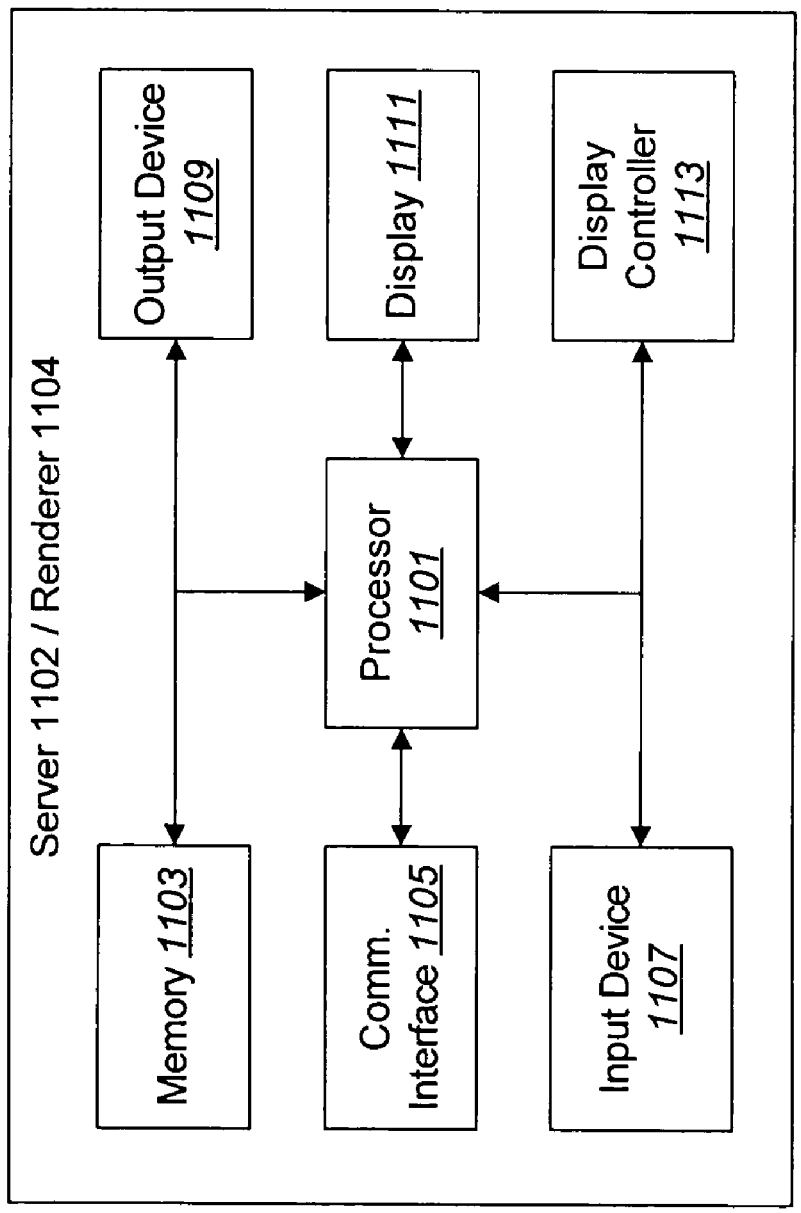
FIG. 11 is a block diagram illustrating the major hardware components typically utilized in a media server and/or media renderer.

FIG. 11 is a block diagram illustrating the major hardware components typically utilized in a media server 1102 and/or media renderer 1104. The illustrated components may be located within the same physical structure or in separate housings or structures.

The server 1102/renderer 1104 includes a processor 1101 and memory 1103. The processor 1101 controls the operation of the server 1102/renderer 1104 and may be embodied as a microprocessor, a microcontroller, a digital signal processor (DSP) or other device known in the art. The processor 1101 typically performs logical and arithmetic operations based on program instructions stored within the memory 1103.

As used herein, the term "memory" 1103 is broadly defined as any electronic component capable of storing electronic information, and may be embodied as read only memory (ROM), random access memory (RAM), magnetic disk storage media, optical storage media, flash memory devices in RAM, on-board memory included with the processor 1101, EPROM memory, EEPROM memory, registers, etc. The memory 1103 typically stores program instructions and other types of data. The program instructions may be executed by the processor 1101 to implement some or all of the methods disclosed herein.

The server 1102/renderer 1104 typically also includes one or more communication interfaces 1105 for communicating with other electronic devices. The communication interfaces 1105 may be based on wired communication technology, wireless communication technology, or both. Examples of different types of communication interfaces 1105 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The server 1102/renderer 1104 typically also includes one or more input devices 1107 and one or more output devices 1109. Examples of different kinds of input devices 1107 include a keyboard, mouse, microphone, remote control device, button, joystick, trackball, touchpad, lightpen, etc. Examples of different kinds of output devices 1109 include a speaker, printer, etc. One specific type of output device which is typically included in a computer system is a display device 1111. Display devices 1111 used with embodiments disclosed herein may utilize any suitable image projection technology, such as a cathode ray tube (CRT), liquid crystal display (LCD), light-emitting diode (LED), gas plasma, electroluminescence, or the like. A display controller 1113 may also be provided, for converting data stored in the memory 1103 into text, graphics, and/or moving images (as appropriate) shown on the display device 1111.

Of course, FIG. 11 illustrates only one possible configuration of a server 1102/renderer 1104. Those skilled in the art will recognize that various other architectures and components may be utilized. In addition, various standard components are not illustrated in order to avoid obscuring aspects of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A media server device, comprising:
   a tuner for accessing a plurality of broadcast channels and providing content from the plurality of broadcast channels to a media renderer; and
   an enhanced Universal Plug and Play (UPnP) Audio Video (AV) Content Directory Service (CDS) implementation, the implementation comprising:
   a tuner container that represents the tuner, wherein the tuner container allows multiple tuners to be represented in the UPnP AV CDS, wherein the tuner container has its own universal resource identifier (URI), and wherein the tuner container comprises a reference object; and
   a plurality of broadcast items within the tuner container that represent the plurality of broadcast channels, wherein each broadcast item of the plurality of broadcast items has its own URI that is separate from the URI of the tuner container, wherein the plurality of broadcast items are arranged within the tuner container in an order that corresponds to a channel scanning order of the tuner, and wherein feedback of a current channel selection is enabled when multiple client devices are connected to the tuner and controlling channel selection;
   wherein the enhanced UPnP AV CDS implementation is organized in accordance with a class hierarchy that comprises a tuner class derived from a container class and at least one broadcast item class derived from an item class, wherein the reference object is an instance of a broadcast item class, wherein the reference object comprises a reference to one of the plurality of broadcast items corresponding to a currently selected broadcast channel;
   wherein a user browses the plurality of broadcast items within the tuner container by connecting to the URI of the tuner container, and wherein connecting to the URI of the tuner container does not change the currently selected broadcast channel;
   wherein the enhanced UPnP AV CDS implementation transmits a channel selection notification to a control point when the currently selected broadcast channel is changed, wherein the reference object within the tuner container is changed when the currently selected broadcast channel is changed, wherein the changing of this reference object causes the channel selection notification, and wherein any prior reference object that refers to an unselected channel is deleted when the reference object is changed;
   wherein the tuner container further comprises a channel select feedback container, and wherein the reference object is created within the channel select feedback container when the currently selected broadcast channel is changed, thereby triggering the channel selection notification;
   wherein the tuner container is defined by an XML schema;
   wherein the XML schema for the tuner container comprises a container-identifier field, a tuner container title field, a tuner container UPnP class field and a tuner container protocol information field that includes the URI of the tuner container;
   wherein the XML schema also defines each of the plurality of broadcast items;
   wherein a definition of a particular broadcast item comprises a broadcast item title field, a station identifier field, a broadcast item UPnP class field, a channel number field, and a broadcast item protocol information field that includes the URI of the broadcast item;
   wherein the XML schema also defines the reference object;
   wherein the XML schema for the reference object comprises a reference object title field and a reference object UPnP class field; and
   wherein the XML schema defines the channel select feedback container, wherein the XML schema for the channel select feedback container comprises a container-identifier field, a channel select feedback container title field, a channel select feedback container UPnP class field, and a reference object field that identifies the currently selected broadcast channel.

2. The media server device of claim 1, wherein the plurality of broadcast channels are audio broadcast channels, and wherein the plurality of broadcast items are audio broadcast items.

3. The media server device of claim 1, wherein the plurality of broadcast channels are video broadcast channels, and wherein the plurality of broadcast items are video broadcast items.

4. The media server device of claim 1, wherein the media server device sends information about the broadcast items to the control point in response to a browse request.

5. The media server of claim 4, wherein the control point listens for the reference object created by the channel select feedback container.

6. The media server of claim 5, wherein the tuner container only contains the plurality of broadcast items.

7. A media server device, comprising:
  a tuner for accessing a plurality of broadcast channels and providing content from the plurality of broadcast channels to a media renderer; and
  an enhanced Universal Plug and Play (UPnP) Audio Video (AV) Content Directory Service (CDS) implementation, comprising:
    a tuner container that represents the tuner, wherein the tuner container allows multiple tuners to be represented in the UPnP AV CDS, wherein the tuner container has its own universal resource identifier (URI), and wherein the tuner container comprises a reference object; and
    a plurality of broadcast items within the tuner container that represent the plurality of broadcast channels, wherein each of the plurality of broadcast items has a unique channel number associated therewith, wherein each broadcast item of the plurality of broadcast items has its own URI that is separate from the URI of the tuner container, and wherein feedback of a current channel selection is enabled when multiple client devices are connected to the tuner and controlling channel selection;
  wherein the enhanced UPnP AV CDS implementation is organized in accordance with a class hierarchy that comprises a tuner class derived from a container class and at least one broadcast item class derived from an item class, wherein the reference object is an instance of a broadcast item class, wherein the reference object comprises a reference to one of the plurality of broadcast items corresponding to a currently selected broadcast channel;
  wherein a user browses the plurality of broadcast items within the tuner container by connecting to the URI of the tuner container, and wherein connecting to the URI of the tuner container does not change the currently selected broadcast channel;
  wherein the enhanced UPnP AV CDS implementation transmits a channel selection notification to the control point when the currently selected broadcast channel is changed, wherein the reference object within the tuner container is changed when the currently selected broadcast channel is changed, wherein the changing of this reference object causes the channel selection notification, and wherein any prior reference object that refers to an unselected channel is deleted when the reference object is changed;
  wherein the tuner container further comprises a channel select feedback container, and wherein the reference object is created within the channel select feedback container when the currently selected broadcast channel is changed, thereby triggering the channel selection notification;
  wherein the tuner container is defined by an XML schema;
  wherein the XML schema for the tuner container comprises a container-identifier field, a tuner container title field, a tuner container UPnP class field and a tuner container protocol information field that includes the URI of the tuner container;
  wherein the XML schema also defines each of the plurality of broadcast items;
  wherein a definition of a particular broadcast item comprises a broadcast item title field, a station identifier field, a broadcast item UPnP class field, a channel number field, and a broadcast item protocol information field that includes the URI of the broadcast item;
  wherein the XML schema also defines the reference object;
  wherein the XML schema for the reference object comprises a reference object title field and a reference object UPnP class field; and
  wherein the XML schema defines the channel select feedback container, wherein the XML schema for the channel select feedback container comprises a container-identifier field, a channel select feedback container title field, a channel select feedback container UPnP class field, and a reference object field that identifies the currently selected broadcast channel.

8. In a media server device, a method comprising:
  representing a tuner as a tuner container, wherein the tuner container allows multiple tuners to be represented in an enhanced Universal Plug and Play (UPnP) Audio Video (AV) Content Directory Service (CDS), wherein the tuner container has its own universal resource identifier (URI), and wherein the tuner container comprises a reference object;
  representing a plurality of broadcast channels which are accessible to the tuner as broadcast items within the tuner container, wherein each broadcast item of the plurality of broadcast items has its own URI that is separate from the URI of the tuner container;
  exposing the broadcast items within the tuner container as an object for browsing by a control point;
  wherein the tuner container is part of an enhanced UPnP AV CDS implementation that is organized in accordance with a class hierarchy that comprises a tuner class derived from a container class and at least one broadcast item class derived from an item class, and wherein feedback of a current channel selection is enabled when multiple client devices are connected to the tuner and controlling channel selection, wherein the reference object is an instance of a broadcast item class, wherein the reference object comprises a reference to one of the plurality of broadcast items corresponding to a currently selected broadcast channel;
  wherein a user browses the plurality of broadcast items within the tuner container by connecting to the URI of the tuner container, and wherein connecting to the URI of the tuner container does not change the currently selected broadcast channel;
  wherein the enhanced UPnP AV CDS implementation transmits a channel selection notification to the control point when the currently selected broadcast channel is changed, wherein the reference object within the tuner container is changed when the currently selected broadcast channel is changed, wherein the changing of this reference object causes the channel selection notification, and wherein any prior reference object that refers to an unselected channel is deleted when the reference object is changed;
  wherein the tuner container further comprises a channel select feedback container, and wherein the reference object is created within the channel select feedback container when the currently selected broadcast channel is changed, thereby triggering the channel selection notification;
  wherein the tuner container is defined by an XML schema;
  wherein the XML schema for the tuner container comprises a container-identifier field, a tuner container title field, a tuner container UPnP class field and a tuner container protocol information field that includes the URI of the tuner container;

wherein the XML schema also defines each of the plurality of broadcast items;

wherein a definition of a particular broadcast item comprises a broadcast item title field, a station identifier field, a broadcast item UPnP class field, a channel number field, and a broadcast item protocol information field that includes the URI of the broadcast item;

wherein the XML schema also defines the reference object;

wherein the XML schema for the reference object comprises a reference object title field and a reference object UPnP class field; and wherein the XML schema defines the channel select feedback container, wherein the XML schema for the channel select feedback container comprises a container-identifier field, a channel select feedback container title field, a channel select feedback container UPnP class field, and a reference object field that identifies the currently selected broadcast channel.

9. The method of claim 8, further comprising sending information about the broadcast item to the control point in response to a browse request.

10. The method of claim 9, further comprising establishing a connection with a first media renderer for transmission of content from the broadcast channel to the first media renderer.

11. The method of claim 10, further comprising:
accepting a connection request from a second media renderer; and
disconnecting the connection to the first media renderer.

12. The method of claim 10, further comprising:
accepting a connection request from a second media renderer;
maintaining the connection to the first media renderer; and
receiving a channel selection from the second media renderer.

13. A non-transitory computer-readable medium comprising executable instructions for:
representing a tuner as a tuner container, wherein the tuner container allows multiple tuners to be represented in an enhanced Universal Plug and Play (UPnP) Audio Video (AV) Content Directory Service (CDS), wherein the tuner container has its own universal resource identifier (URI), and wherein the tuner container comprises a reference object;
representing a plurality of broadcast channels which are accessible to the tuner as broadcast items within the tuner container, wherein each of the plurality of broadcast channels has its own URI that is separate from the URI of the tuner container;
exposing the broadcast items within the tuner container as an object for browsing by a control point;
wherein the tuner container is part of an enhanced UPnP AV CDS implementation that is organized in accordance with a class hierarchy that comprises a tuner class derived from a container class and at least one broadcast item class derived from an item class, and wherein feedback of a current channel selection is enabled when multiple client devices are connected to the tuner and controlling channel selection, wherein the reference object is an instance of a broadcast item class, wherein the reference object comprises a reference to one of the plurality of broadcast items corresponding to a currently selected broadcast channel;
wherein a user browses the plurality of broadcast items within the tuner container by connecting to the URI of the tuner container, and wherein connecting to the URI of the tuner container does not change the currently selected broadcast channel;

wherein the enhanced UPnP AV CDS implementation transmits a channel selection notification to the control point when the currently selected broadcast channel is changed, wherein the reference object within the tuner container is changed when the currently selected broadcast channel is changed, wherein the changing of this reference object causes the channel selection notification, and wherein any prior reference object that refers to an unselected channel is deleted when the reference object is changed;

wherein the tuner container further comprises a channel select feedback container, and wherein the reference object is created within the channel select feedback container when the currently selected broadcast channel is changed, thereby triggering the channel selection notification;

wherein the tuner container is defined by an XML schema;

wherein the XML schema for the tuner container comprises a container-identifier field, a tuner container title field, a tuner container UPnP class field and a tuner container protocol information field that includes the URI of the tuner container;

wherein the XML schema also defines each of the plurality of broadcast items;

wherein a definition of a particular broadcast item comprises a broadcast item title field, a station identifier field, a broadcast item UPnP class field, a channel number field, and a broadcast item protocol information field that includes the URI of the broadcast item;

wherein the XML schema also defines the reference object;

wherein the XML schema for the reference object comprises a reference object title field and a reference object UPnP class field; and wherein the XML schema defines the channel select feedback container, wherein the XML schema for the channel select feedback container comprises a container-identifier field, a channel select feedback container title field, a channel select feedback container UPnP class field, and a reference object field that identifies the currently selected broadcast channel.

14. The non-transitory computer-readable medium of claim 13, wherein the instructions are also executable for sending information about the broadcast item to the control point in response to a browse request.

15. The non-transitory computer-readable medium of claim 14, wherein the instructions are also executable for establishing a connection with a first media renderer for transmission of content from the broadcast channel to the first media renderer.

16. The non-transitory computer-readable medium of claim 15, wherein the instructions are also executable for:
accepting a connection request from a second media renderer; and
disconnecting the connection to the first media renderer.

17. The non-transitory computer-readable medium of claim 15, wherein the instructions are also executable for:
accepting a connection request from a second media renderer;
maintaining the connection to the first media renderer; and
receiving a channel selection from the second media renderer.

* * * * *